(12) United States Patent
Reynolds et al.

(10) Patent No.: US 9,902,804 B2
(45) Date of Patent: Feb. 27, 2018

(54) DONOR-ACCEPTOR COMPOSITIONS TO ACHIEVE HIGH CONTRAST BROADLY ABSORBING ELECTROCHROMIC POLYMERS

(71) Applicant: Georgia Tech Research Corporation, Atlanta, GA (US)

(72) Inventors: John R. Reynolds, Dunwoody, GA (US); Justin Adam Kerszulis, Foster City, CA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 58 days.

(21) Appl. No.: 15/049,687

(22) Filed: Feb. 22, 2016

(65) Prior Publication Data
US 2016/0244553 A1 Aug. 25, 2016

Related U.S. Application Data

(60) Provisional application No. 62/118,842, filed on Feb. 20, 2015.

(51) Int. Cl.
*G02F 1/15* (2006.01)
*C08G 61/12* (2006.01)

(52) U.S. Cl.
CPC ......... *C08G 61/123* (2013.01); *C08G 61/126* (2013.01); *G02F 1/15* (2013.01);
(Continued)

(58) Field of Classification Search
CPC .............. C08G 61/123; C08G 2261/54; C08G 2261/74; C08G 2261/126;
(Continued)

(56) References Cited

FOREIGN PATENT DOCUMENTS

WO    WO 2014-205024    12/2014

OTHER PUBLICATIONS

Justin Adam Kerszulis, Reading the Rainbow: Tailoring the Properties of Electrochromic Polymers, In Partial Fulfillment of the Requirements for the Degree Doctor of Philosophy in the School of Chemistry and Biochemistry, Dec. 2014.*

(Continued)

*Primary Examiner* — Bijan Ahvazi
(74) *Attorney, Agent, or Firm* — Saliwanchik, Lloyd & Eisenschenk (57) ABSTRACT

An improved contrast electrochromic polymers(ECP), is a copolymer having donor sequences with a normal distribution of at least one solubilizing donor repeating unit selected from substituted propylenedioxythiophene units (ProDOT) and/or substituted acyclic dioxythiophene units (AcDOT) and a plurality of monodispersed trimer sequences consisting of an acceptor unit bonded between two ethylenedioxythiophene units (EDOT), two methylenedioxythiophene units (MDOT), or a fused DAD trimer, where the monodispersed trimer sequence separates two of the donor sequences. One useful monodispersed trimer sequence is EDOT-BTD-EDOT (EBE). The donor sequences can have ProDOT units bound to the monodispersed trimer sequence. The donor sequence can have ProDOT units alternating with AcDOT units. Useful ECPs can have the structure: Pro-Pro/EBE; Ac-Ac/EBE; or Pro-Ac$_x$/EBE$_{1-x}$ where x is a fraction between 0.5 and 0.9.

12 Claims, 10 Drawing Sheets

(52) U.S. Cl.
    CPC .......... *C08G 2261/126* (2013.01); *C08G 2261/1424* (2013.01); *C08G 2261/3223* (2013.01); *C08G 2261/3243* (2013.01); *C08G 2261/3246* (2013.01); *C08G 2261/364* (2013.01); *C08G 2261/54* (2013.01); *C08G 2261/74* (2013.01); *G02F 2001/1515* (2013.01)

(58) Field of Classification Search
    CPC .... C08G 2261/3223; C08G 2261/3242; C08G 2261/3243; C08G 2261/3246; G02F 1/15; G02F 2001/1515
    USPC .......... 252/62.2, 500, 586; 427/58, 66, 458; 526/240; 528/8, 9, 380; 549/50
    See application file for complete search history.

(56) References Cited

OTHER PUBLICATIONS

J. A. Kerszulis, K. E. Johnson, M. Kuepfert, D. Khoshabo, A. L. Dyer and J. R. Reynolds, Tuning the painter's palette: subtle steric effects on spectra and colour in conjugated electrochromic polymers, J. Mater. Chem. C, 2015, 3, 3211-3218.*

Gaupp, C.L. et al., Poly(ProDOT-Et$_2$): A High-Contrast, High-Coloration Efficiency Electrochromic Polymer, *Macromol. Rapid Commun.*, 2002, pp. 885-889, vol. 23.

Kerszulis, J.A., "Reading the rainbow: tailoring the properties of electrochromic polymers," PhD Thesis, Georgia Institute of Technology, 2014.

Li, Z. et al., Electropolymerizable Conjugated Polymers with High Contrast in Infrared Region, *Open Journal of Polymer Chemistry*, 2012, pp. 152-158, vol. 2.

Beaujuge, P.M. et al., "The donor-acceptor approach allows a black-to-transmissive switching polymeric electrochrome," *Nature Materials*, Oct. 2008, pp. 795-799, vol. 7.

Beaujuge, P.M. et al., "Structure-Performance Correlations in Spray-Processable Green Dioxythiophene-Benzothiadiazole Donor-Acceptor Polymer Electrochromes," *Chemistry of Materials*, 2012, pp. 255-268, vol. 24.

Gunbas, G.E. et al., "Could Green Be Greener? Novel-Donor-Acceptor Type Electrochromic Polymers: Towards Excellent Neutral Green Materials with Exceptional Transmissive Oxidized States for Completion of RGB Color Space," *Advanced Materials*, 2008, pp. 691-695, vol. 20.

Kerszulis, J.A. et al., "Tuning the painter's palette: subtle steric effects on spectra and colour in conjugated electrochromic polymers," *Journal of Materials Chemistry C*, 2015, pp. 3211-3218, vol. 3.

Shi, P. et al., "Broadly Absorbing Black to Transmissive Switching Electrochomic Polymers," *Advanced Materials*, 2010, pp. 4949-4953, vol. 22.

Zhou, H. et al., "Two novel ambiopolar donor-acceptor type eletrochomic polymers with the realization of RGB (red-green-blue) display in one polymer," *RSC Adv.*, 2014, pp. 61537-61547, vol. 4.

* cited by examiner p(x+y) Br-D$_s$-Br + px H-D$_s$-H + py H-D$_r$-A-D$_r$-H → [(D$_s$-D$_s$)$_m$(D$_r$-A-D$_r$-D$_s$)$_n$]$_p$ p(x+y) Br-D$_s$-Br + px H-D$_s$'-H + py H-D$_r$-A-D$_r$-H → [(D$_s$'-D$_s$)$_m$(D$_r$-A-D$_r$-D$_s$)$_n$]$_p$

DONOR-ACCEPTOR COMPOSITIONS TO ACHIEVE HIGH CONTRAST BROADLY ABSORBING ELECTROCHROMIC POLYMERS

CROSS-REFERENCE TO A RELATED APPLICATION

This application claims the benefit of U.S. Provisional Application Ser. No. 62/118,842, filed Feb. 20, 2015, the disclosure of which is hereby incorporated by reference in its entirety, including all figures, tables and drawings.

BACKGROUND OF INVENTION

Electrochromism is the ability of a material to change its electromagnetic radiation absorptive properties with the application of a current or voltage. The most practical color change is from an absorptive colored state to a colorless transmissive state, which allows shades to be turned on and turned off completely upon application of a current. Many materials, for example, transition metal oxides, Prussian Blues, some small organic molecules, and some π-conjugated polymers, demonstrate electrochromism. Electrochromic materials are useful for many technologies including displays, signage, windows, security, camouflage, and wearable fabrics.

The development of electrochromic windows or eyewear having panes or lenses that can switch from black or dark colored states to nearly colorless transmissive forms has been dominated by electrochromic metal oxides. A typical metal oxide based electrochromic device has a colored state resulting from a cathodically coloring tungsten oxide to absorb long wavelength light and an anodically coloring nickel oxide or vanadium oxide to absorb short and medium wavelength light in a color-mix that achieves an aesthetically pleasing and highly black color-neutral hue. These devices from transition metal oxides typically require 20 seconds or more to complete a full switch. While the switching speed is of little concern for architectural window-type electrochromic devices (ECDs), such speeds are not viable for applications such as automotive/aircraft windshields or pilot/athletic visors, where sub-second color to colorless switching is necessary or desired. Metal oxide electrochromic windows unfortunately possess a considerable degree of residual absorption in their transmissive states.

In contrast to metal oxides, a-conjugated electrochromic polymers (ECPs) have demonstrated a facility for color tuning due to polymer structural modification, color mixing via solution blends of polymers, and variations of device architectures. Because ECPs are typically cast as porous amorphous films, they exhibit an ability to switch rapidly with high contrast, with typical switching times ranging from two seconds to less than one second. ECPs have advantages for processing the devices, as thin films can be prepared using roll-to-roll techniques where solubility of the film is diminished by post-deposition functionalization. ECPs that are water soluble and display fast electrochromic switching are available.

To match the color neutrality achieved by metal oxides using a single ECP, complex backbone architecture has been developed where donor-acceptor (D-A) interactions permit absorption of long wavelength light and random length donor segments absorb medium to short wavelength light. ECPs with a high spectral broadness was first reported in Beaujuge et al., *Nat Mater* 2008, 7 (10), 795-9, where a random oxidative copolymerization of 3,4-propylenedioxythiophene (ProDOT) monomer with a ProDOT-benzothiadiazole (BTD)-ProDOT trimer was carried out. This "ECP-Black" displays long and medium runs of ProDOTs absorbed moderate wavelength light while the ProDOT-BTD-ProDOT segments absorbed short wavelengths. Greater color neutrality was then achieved by broadening of the absorption spectrum in the visible region, as reported in Shi et al. *Advanced Materials* 2010, 22 (44), 4949-53, where a Stille polymerization permitted shorter segments of ProDOTs in a chain that permitted more efficient capture of shorter wavelengths of light to achieve a more completely black neutral state. Subsequently, additional chemically polymerized black-to-transmissive ECPs have been achieved. Similar broadening effects for black-to-transmissive electrochromism have been achieved through the electropolymerization of monomers that utilize donor-acceptor (D-A) interactions, by making polymer blends, or by coupling poly(3,4-ethylenedioxthiophene) (PEDOT) with a yellow organic dye.

Like metal oxides, the black-to-transmissive polymers and devices display residual absorption in their transmissive states, which results in a less than desirable contrast across the visible spectrum during electrochromic switching. Many ophthalmic tints and coatings require an integrated contrast ($\Delta \% T_{int}$) across the visible of ~50%, which is a value that ECP-Black is unable to achieve. Hence, the identification of ECPs with greater integrated contrast and their implementation in devices is desired.

BRIEF SUMMARY

Embodiments of the invention are directed to improved contrast electrochromic polymers (ECPs), where a copolymer includes a plurality of donor sequences that is a normal distribution of at least one solubilizing donor repeating unit selected from substituted propylenedioxythiophene units (ProDOT) and/or a substituted acyclic dioxythiophene unit (AcDOT) and a plurality of monodispersed trimer sequence consisting of an acceptor unit bonded between two ethylenedioxythiophene units (EDOT), two methylenedioxythiophene units (MDOT), or a fused DAD trimer, where the monodispersed trimer sequence separates two of the donor sequences. The acceptor unit can include a residue of 2,1,3-benzothiadiazole (BTD). The monodispersed trimer sequence can be EDOT-BTD-EDOT (EBE). The donor sequences can have ProDOT units bound to the monodispersed trimer sequence and the donor sequences can have ProDOT units alternating with AcDOT units. The ECP has the structure: Pro-Pro/EBE;Ac -Ac/EBE; or Pro-Ac$_x$/EBE$_{1-x}$ where x is a fraction between 0.5 and 0.9.

Another embodiment of the invention is directed to an electrochromic device that employs at least one film or solution of at least one improved contrast electrochromic polymer ECP) according to claim 1. One or more films or solutions can be a mixture including at least one acceptor free electrochromic polymer in addition to the improved contrast electrochromic polymer (ECP). The acceptor free electrochromic polymer can be included at one to 50% with the improved contrast electrochromic polymer (ECP). The acceptor free electrochromic polymer can be ProDOT$_2$-EDOT and the improved contrast electrochromic polymer (ECP) can be Pro-Ac$_{0.65}$/EBE$_{0.35}$.

Another embodiment of the invention is directed to a method of preparing an improved contrast electrochromic polymer (ECP), where a plurality of DAD trimers having hydrogens as terminal reactive groups, a plurality of a first solubilizing donor repeating units having hydrogen reactive groups, and a plurality of a second solubilizing donor repeating units having bromine reactive groups are combined such that condensation between the hydrogen and the bromine reactive groups is promoted to yield the improved contrast electrochromic polymer (ECP).

DETAILED DISCLOSURE

Embodiments of the invention are directed to an electrochromic polymer ECP that broadly absorbs across the visible spectrum in the neutral state and can be converted to a highly transmissive oxidized state with high contrast. All polymers disclosed herein are copolymers, though recited as polymers. The ECP possess a black, brown, deep purple, green, blue or cyan neutral colored state. The ECP possesses a desired color and has the capability to switch to a highly contrasting transmissive state by combining steric control due to the choice of the structures and proportions of main chain electron-rich rings and use of a "relaxed" donor-acceptor (D-A) unit of the chain. A "relaxed" donor-acceptor (DA) unit is a DAD trimer unit comprising an aromatic electron acceptor unit flanked by sterically (torsionally) relaxed heteroaromatic donor units, where steric interactions do not promote orthogonality between adjacent D and A units to limit the conjugation to less than the entire three aromatic units. The acceptor unit of the DAD trimer can be a 2,1,3-benzothiadiazole (BTD), 2,1,3-benzofurazan, benzotriazole (BTA), or any derivative thereof. The donor units of the relaxed DAD trimer units independently are 3,4-methylenedioxythiophenes, 3,4-ethylenedioxythiopnes, 3,4-methylenedioxythiofuranes, 3,4-ethylenedioxyfuranes, 3,4-methylenedioxypyrroles, 3,4-ethylenedioxypyrroles, 3,4-methylenedioxyphospholes, 3,4-ethylenedioxyphospholes, 3,4-methylenedioxyselenoles, and 3,4-ethylenedioselenoles, where the pyrrole nitrogen or the phosphole phosphorous atom can be substituted with H, or $C_1$ to $C_{10}$ alkyl group. The DAD trimer can be a fused trimer, where each donor portion shares two carbons with the accepter portion of the fused DAD trimer unit. The fused DAD trimer can have the structure:

where X is S, O, NR', R is H or alkoxy, and R' is H or alkyl.

Figure 1:
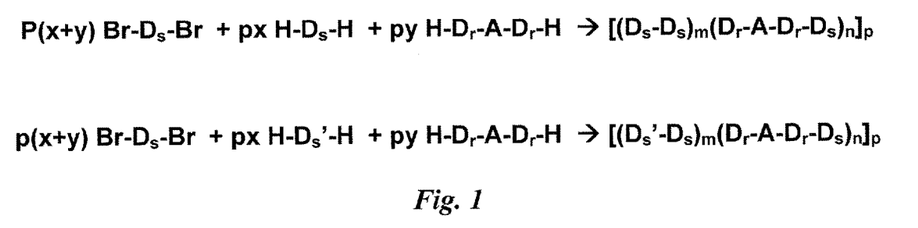
FIG. 1 shows general copolymerization schemes for an electrochromic polymer (ECP) according to an embodiment of the invention, where one or more sterically bulky repeating units, -$D_s$- and/or -$D_s'$-, are polymerized with a DAD trimeric unit that is an acceptor unit, -A-, flanked by two relaxed donor units, -$D_r$-.

The DAD trimer is randomly bonded to other more sterically hindered heterocycles, aryl rings, other 3,4-substituted thiophenes, other 3,4-substituted pyrroles, or other 3,4-substituted furans or fused ring aromatic units to control the broadness of absorption in the neutral state while acceptors flanked by sterically relaxed donors enable high transmittance in the oxidized state. For example, some units of the ECP copolymers can be donor units that are substituted to impart :solubility to the ECP for processing. For example, the don.or units in addition to those of the DAD trimer can be a 3,3-bis(((alkyl)oxy)methyl)-3,4-dihydro-2H-thieno[3,4-b][1,4]dioxepines, a pyrrole, furan, phosphole, or selenole equivalent thereof The donor units in addition. to those of the DAD trimer can be 3,4-dialkoxythiophenes, 3,4-dialkylthiophenes, or pyrrole, furan, phosphole, or selenole equivalent thereof Preparation of the copolymers, according to an embodiment of the invention, is shown in FIG. 1 where direct arylation cross coupling yields copolymers of the DAD units with one or more donor units that are more sterically hindered.

The bulky donor units can be substituted with solubilizing groups that are selected from straight or branched alkyl chain of, for example, 1-24 carbon atoms and is, for example, methyl, ethyl, n-propyl, n-butyl, sec butyl, tert-butyl, n-hexyl, n-oetyl, 2-ethylhexyl, n-nonyl, n-decyl, n-undecyl, n-dodecyl, n tridecyl, n-tetradecyl, n-hexadecyl, n-octadecyl or dodecanyl and the like.

The alkyl can be interrupted, one or more times, by one or more oxygen atoms, sulfur atoms, —SO—, —SO$_2$—, carbonyl, —COO—, —CONH—, —NH—, —CON(C$_{1-8}$ alkyl)- or —N(C$_{1-8}$ alkyl)-. The uninterrupted or interrupted alkyl can also be substituted, one or more times, by one or more C$_{3-6}$ cycloalkyl groups, halogen, —OR, —COOR, —COOM, —SO$_3$M, —SO$_3$H, phosphonic acid, halogen, —CONR'R, —NR'R, phosphonate salt, or ammonium salt wherein M is a nitrogen comprising ammonium cation or metal cation. R and R' are, independently, hydrogen, C$_{1-24}$ alkyl, C$_{3-24}$ alkenyl, C$_{3-6}$ cycloalkyl or C$_{1-24}$ alkylcarbonyl. R and R', together with the nitrogen atom to which they are attached, can form a 5-, 6- or 7-membered ring that is uninterrupted or interrupted by —O—, —NH— or —N(C$_{1-12}$ alkyl)-. These groups can permit the ECPs to be included in various formulations and to be soluble in various different solvents or connected to surfaces or bound within networks. The choice of solubilizing groups can impart solubility in organic solvents, such as, methylene chloride, chloroform, toluene, alkanes, tetrahydrofuran, ethanol, methanol, or any other organic solvent, and can impart solubility in water.

The ECPs, according to embodiments of the invention, electrochemically or chemically achieve transmissive and colorless oxidized states. These ECPs can be utilized for applications such as electrochromic windows, subtractive (nonemissive) displays, electrochromic mirrors, E-paper, E-cloth, dual emissive/subtractive displays, and sensing. According to embodiments of the invention, the ECPs can be formed by a method employing synthetically oxidative, electrochemically oxidative, Suzuki, Stille, or direct arylation cross coupling conditions. Direct arylation copolymer synthesis, has been carried out for exemplary embodiments of the invention as suggested in FIG. 1. The direct arylation method is disclosed in International Patent Application Publication No. WO/2014/205024. The polymers are solution processable, and films or coatings can be cast using spin coating, spraying, slot-dye coating, or ink-jet printing methods.

By the use of the relaxed DAD trimer, an improved charge delocalization in a random copolymer backbone results upon oxidation, causing a red-shifting of the residual absorption of the most oxidized transmissive state, such that the oxidized state absorbs less long wavelength visible light, and, consequently, enhances contrast across the visible spectrum.

Some state of the art colored-to-transmissive ECPs have achieved high electrochromic contrast at the D-A charge transfer peak by flanking an aromatic electron acceptor with sterically (torsionally) relaxed 3,4-ethylenedioxythiophene (EDOT) units. Therefore, such enhancement of charge carrier delocalization is incorporated into the ECPs for greater transmission of long wavelength visible light in the ECPs oxidized state. It was discovered that for an exemplary embodiment of the invention, by employing an EDOT flanked BTD acceptor DAD trimer (EDOT-BTD-EDOT or EBE) for incorporation into a random copolymer, an improved contrast black-to-transmissive ECP resulted. Films produced from co-processing of a pair of carefully selected comonomer mixtures results in flat spectral profiles, and an aesthetically pleasing indigo-black hue.

Figure 2:
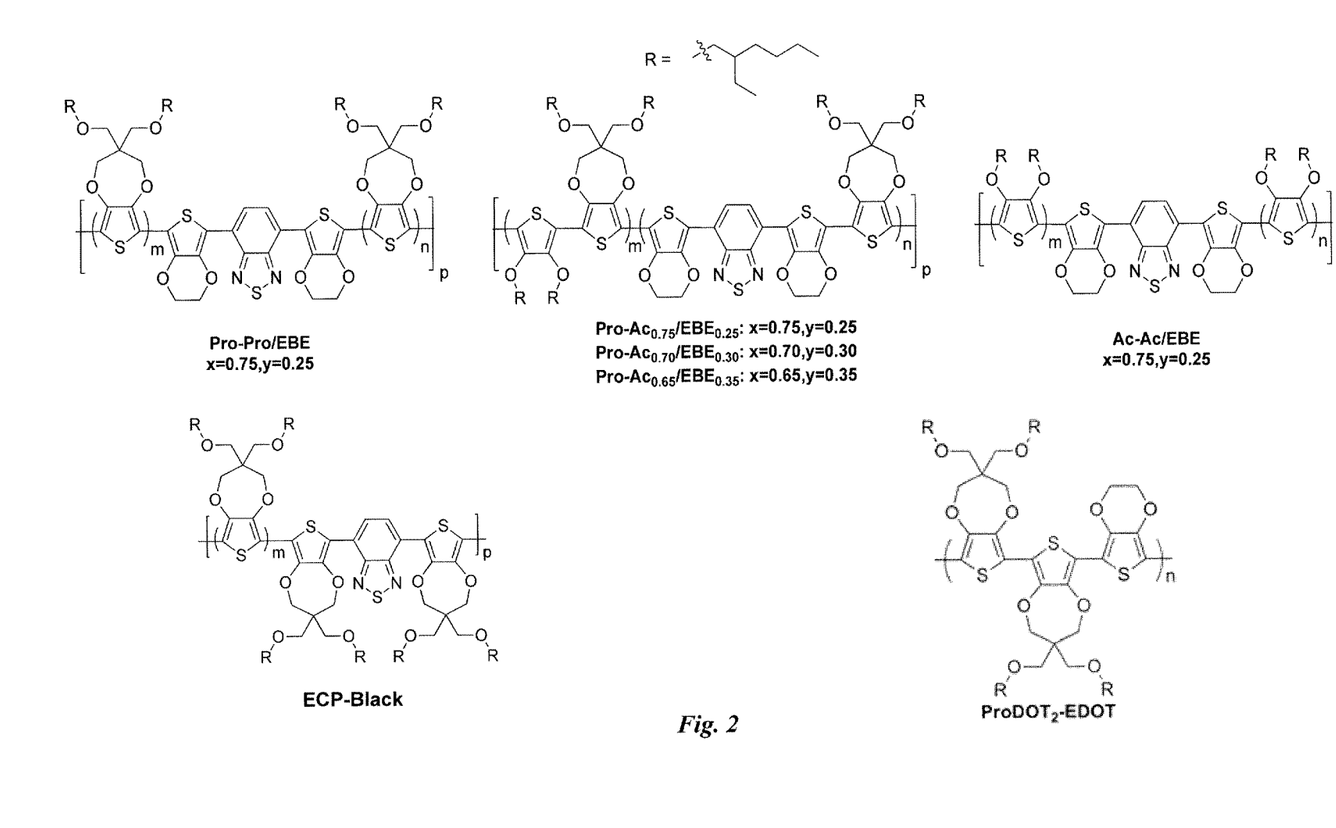
FIG. 2 shows structures of ECPs according to an embodiment of the invention, where an EBE triad is formed with normal distribution sequences of various selected sterically bulky donors, ProDOT (Pro) and/or AcDOT (Ac), within selected proportions of EBE trimer, a ProDOT$_2$-EDOT copolymer for blending, and the structure of a prior art ECP-black polymer used for comparison of properties.
Figure 3:
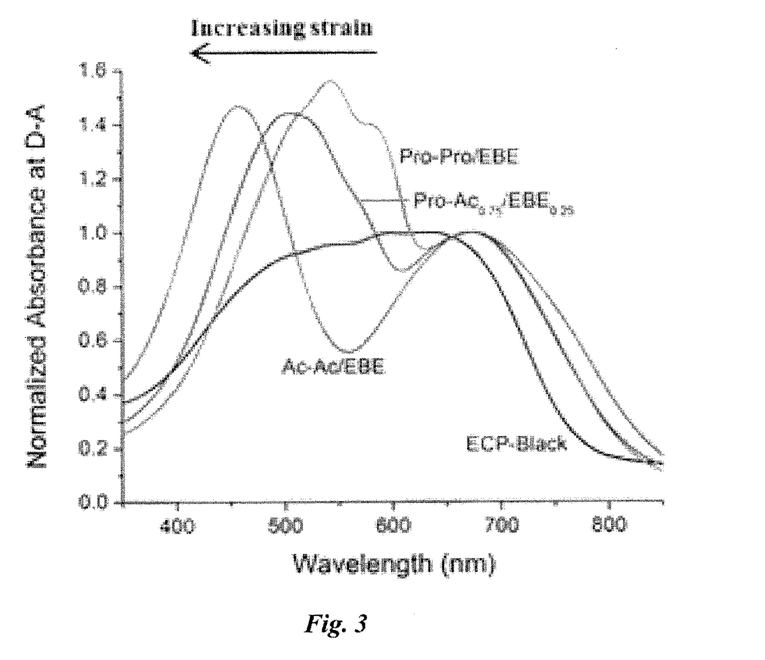
FIG. 3 shows composite spectra normalized at the long wavelength peak of aged films for ECPs, according to an embodiment of the invention, showing significant variations of the π-to-π* transition wavelength with varied strain due to the choice of the sterically bulky donor.

It was discovered that by increasing or decreasing strain imposed by incorporation of donor monomers with greater or lower, respectively, sterically bulky groups on the donor units with the DAD trimer with the relaxed donor flanking the acceptor, a variety of colors could be tuned through broadening the absorption. In this manner, colors are tuned by controlling the steric strain for a fixed quantity of acceptor units, all of which are flanked by only sterically unencumbered "relaxed" donors, This can be observed for specific ECPs with the structures illustrated in FIG. 2. These exemplary embodiments employ the DAD trimer EDOT-BTD-EDOT (EBE) and donors with higher steric requirements, 3,3-bis(((2-ethylhexyl)oxy)methyl)-3,4-dihydro-2H-thieno[3,4-b][1,4]di-oxepines (ProDOT or Pro) and/or 3,4-di(2-ethylhexyl)oxythiophene (AcDOT or Ac). As strain is tuned, the higher energy peak attributed to the π-to-π* is pushed to shorter or longer wavelengths with more or less strain, respectively, while the lower wavelength peak remains fixed. This enables the tuning of colors from purples to reds to greens, for the polymers shown in FIG. 2, where x, as a fraction of the common strained donor Br-D$_s$-Br of FIG. 1 is held at 0.75. The variables x and y are used as a fraction of a monomer, to yield the related specific sequence lengths In and n of the copolymer. As shown by FIG. 3, the color can be tuned but with the use of relaxed acceptors, transmission in the oxidized. state improves, enabling higher contrast upon electrochromic switching.

Figure 4:
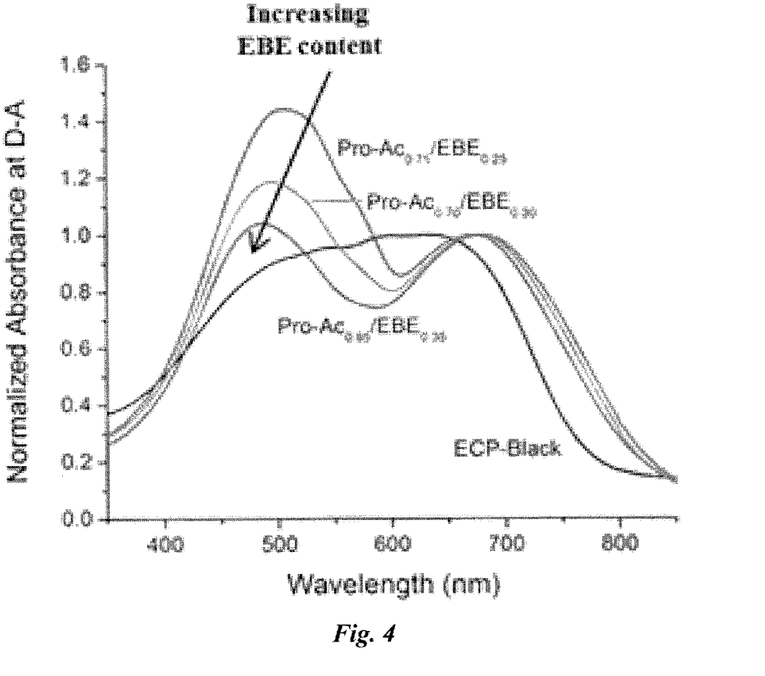
FIG. 4 shows composite spectra normalized at the long wavelength peak of aged films for ECPs, according to an embodiment of the invention, showing little variations of the π-to-π* transition wavelength with varied EBE content.

It was also discovered that for a given steric strain donor component, as determined by the strained donor used, that when the proportion of the acceptor flanked by sterically relaxed donors or of a fused donor-acceptor ring system is increased, colors are tuned to lower L* values in the neutral state by averaging the overall absorption across the visible. This effect is shown in FIG. 4 where the proportion of the EBE truer, as a fraction of monomer, is changed. The relaxed donor-acceptor (D-A) composition also imparts the ECPs with higher levels of transmittance in the fully oxidized state.

Figure 5:
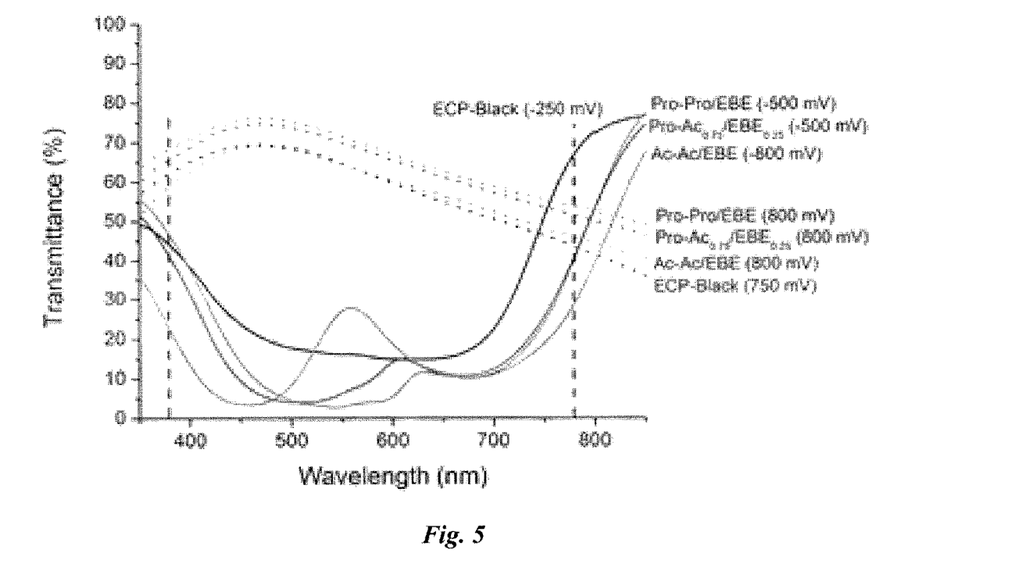
FIG. 5 shows composite transmission spectra for the neutral (solid lines) and fully oxidized (dotted lines) ECPs, according to an embodiment of the invention, for various choices of the sterically bulky donor.
Figure 6:
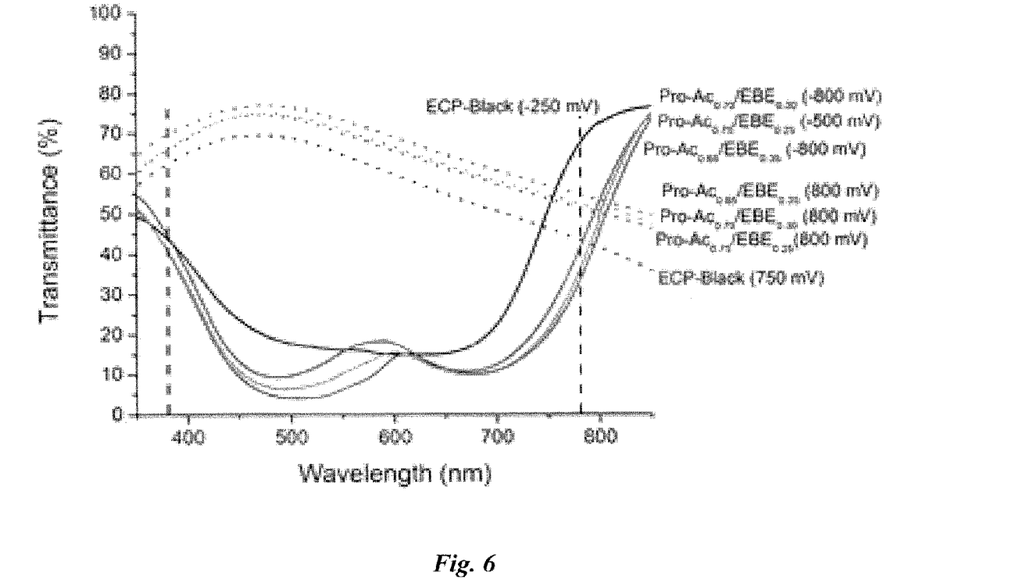
FIG. 6 shows composite transmission spectra for the neutral (solid lines) and fully oxidized (dotted lines) ECPs, according to an embodiment of the invention, for various EBE content.

Hence, while the identity of the strained donor can tune the overall broadness or position of a trench of dual band absorption, to access a variety of colors of ECPs with improved contrast, as indicated in FIG. 5, the relaxed donor acceptor content can be controlled. From FIG. 6, as the content of the relaxed acceptor EBE changes, the spectrum retains the broadness but the absorption becomes more even where the two peaks are closer in absorbance, yielding colors with reduced saturation. This allows access to darker colors that were achieved through π-to-π* tuning due to the choice of strained donors. By the combination of the choice of strained donors and the proportion of the EBE trimer, brown was achieved as well as a black, both having high transmission in the oxidized state. The use of the relaxed acceptors imbues materials with a significantly bathochromically shifted onset.

Figure 7:
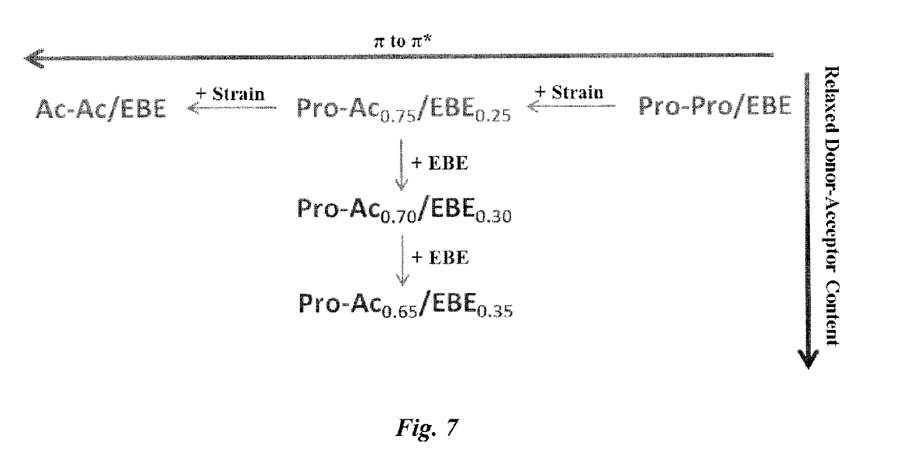
FIG. 7 is a diagram of the ECPs, according to an embodiment of the invention, organized with respect to the factors of selecting the identity of a sterically bulky donor for a fixed EBE content (x axis) and varying the EBE content for a fixed donor identity (y axis).
Figure 8:
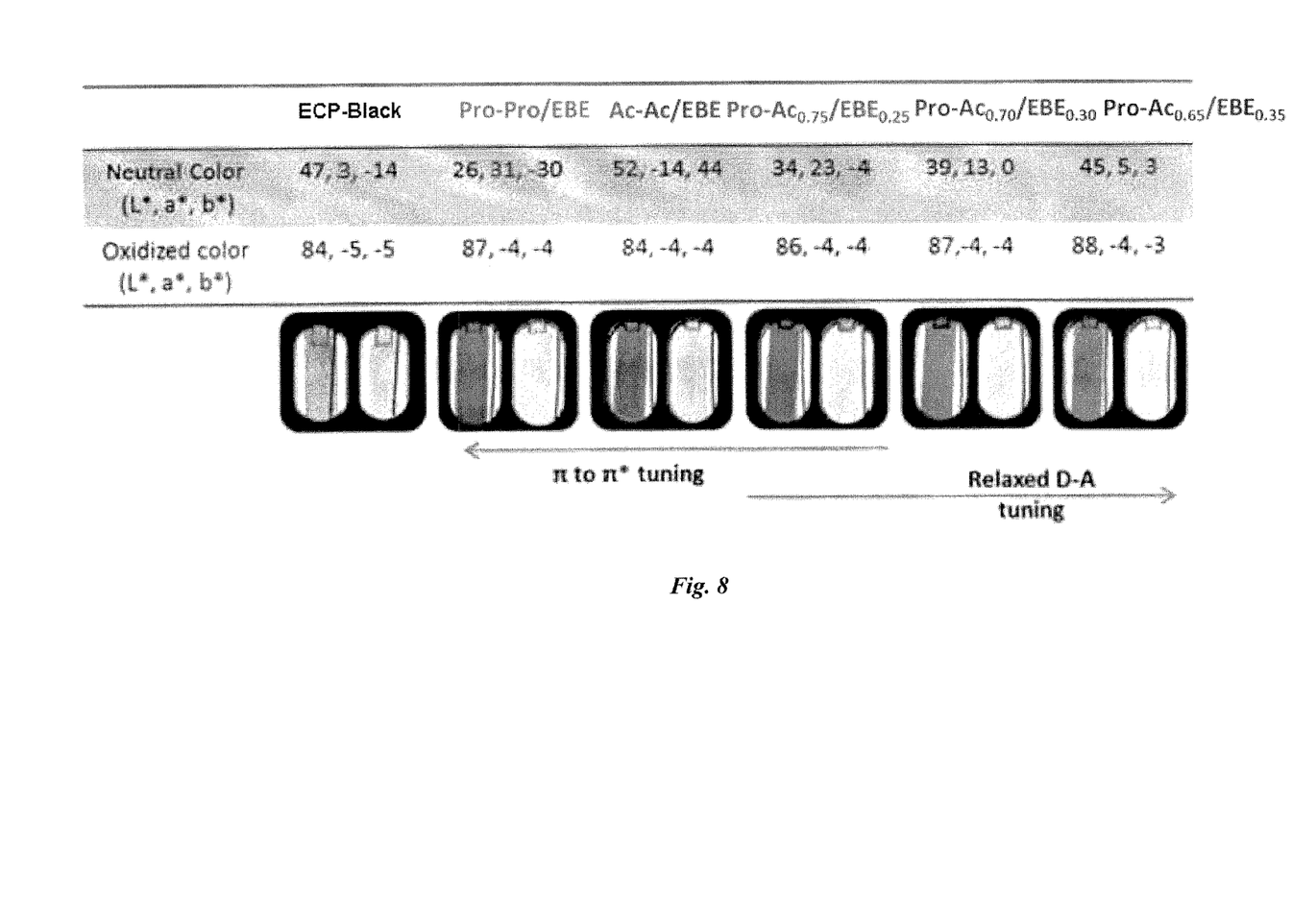
FIG. 8 shows colorimetric color values of the L*a*b* color space for ECPs, according to an embodiment of the invention and ECP-Black, and photographs of thin films in their neutral and fully oxidized states.

As summarized graphically in FIG. 7 for the ECPs according to an exemplary embodiment of the invention, increasing the content of relaxed acceptors does not deplete transmittance in the oxidized form, which, if it occurred, would retard electrochromic contrast. The combination of controlling the two :factors of strain and acceptor content allows color control to be achieved with higher transmission in fully oxidized states, as indicated in FIG. 8.

In another embodiment of the invention, the ECPs can be blended with each other or other electrochromic polymers such that a desired observed spectral combination in the neutral state can be achieved without a deficit of higher color and reduced contrast in the oxidized state in a film or solution for inclusion in an electrochromic device. The blend can be of the polymers with relaxed DA trimers or can be with polymers that are absent of acceptor units entirely. The neutral state color can be chosen as a combination of colors, while the oxidized state color can be minimized where the residual absorptions differ. The proportions can vary from as little as about one percent by weight of the minor ECP to as much as fifty percent for a two polymer mixture. Mixtures can be of two, three, or more polymers that have sufficient structural similarity to be miscible.

METHODS AND MATERIALS

Optoelectronic Properties. Table 1 shows the relevant optoelectronic properties of the polymers synthesized: electrochemical potential onsets, optical absorption maxima of the $\pi$-to-$\pi^*$ and D-A charge transfer interaction, and the onsets of absorption for the polymer films in their pristine and electrochemically-conditioned (aged) states. Integrated contrast values are provided to readily compare overall absorption properties between the neutral and oxidized states.

relates with increasing torsional strain along the conjugated backbone. As the content of EBE increased, a decrease in oxidation potential from 110 mV to 50 mV to −45 mV was observed for Pro-Ac$_{0.75}$/EBE$_{0.25}$ to Pro-Ac$_{0.70}$/EBE$_{0.30}$ to Pro-Ac$_{0.65}$/EBE$_{0.35}$, respectively, and is attributed to increasing EDOT content.

With a relaxed donor-acceptor architecture consisting of an EBE triad, lower energy onsets of absorption were achieved that are 0.10 eV less than the previously achieved for ECP-Black. A slight change in the spectra of the polymers upon going from the pristine initial state to aged states was observed. The shorter wavelength peak corresponding to the $\pi$-to-$\pi^*$ transition exhibits minimal change upon aging, except for an increase in intensity seen with Pro-Pro/EBE. For the lower energy peak, attributed to D-A CT interactions, there is a slight red-shift in both the $\lambda_{max}$ and the onset of absorption, allowing absorption of longer wavelength light with minor increase in intensities. As torsional strain increases from Pro-Pro/EBE to Pro-Ac$_{0.75}$/EBE$_{0.25}$ to Ac-Ac/EBE, the change in absorption onset after aging decreases. The onset changes only minimally as the EBE content is raised from Pro-Ac$_{0.75}$/EBE$_{0.25}$ to Pro-Ac$_{0.70}$/EBE$_{0.30}$ to Pro-AC$_{0.65}$/EBE$_{0.35}$. The changes between the pristine initial and aged state spectra are consistent with backbone reorganization in the form of planarization of the EBE triad. This is also seen in a decrease in onset of electrochemical oxidation shown in CV cycles, as has been observed in other pi-conjugated systems.

Thin Film Spectroscopy. The spectral properties of the neutral states, after aging, are shown in FIGS. 3 and 4. The peaks are normalized to the longer wavelength D-A band to emphasize the effect on contrast from relaxed D-A CT interactions. From FIG. 3, as torsional strain is increased from Pro-Pro/EBE to Pro-Ac$_{0.75}$/EBE$_{0.25}$ to Ac-Ac/EBE, the $\lambda_{max}$ blue shifts from 543 to 505 to 457 nm, respectively, and the window of transmission gradually becoming more pronounced until the window is positioned at 558 nm for Ac-Ac/EBE, which has a green neutral state. In FIG. 4, as

TABLE 1

Optoelectronic properties of ECPs

| Polymer | RedOx$_{onset}$[a] | $\pi$ to $\pi^*$[b] | D-A Inial[b] | D-A aged[b] | Absorp Initia[c] | Absorp Aged[c] | % Contrast[d] |
|---|---|---|---|---|---|---|---|
| ECP-Black | 52 | 634[e] | —[e] | —[e] | 1.61 | 1.61 | 34.2 |
| Pro-Pro/EBE | 13 | 543 | 652 | 675 | 1.59 | 1.50 | 52.8 |
| Ac-Ac/EBE | 180 | 457 | 670 | 674 | 1.47 | 1.45 | 45.6 |
| Pro-Ac$_{0.75}$/EBE$_{0.25}$ | 110 | 505 | 660 | 671 | 1.54 | 1.50 | 51.0 |
| Pro-Ac$_{0.70}$/EBE$_{0.30}$ | 50 | 495 | 666 | 677 | 1.50 | 1.49 | 51.2 |
| Pro-Ac$_{0.65}$/EBE$_{0.35}$ | −45 | 487 | 668 | 680 | 1.49 | 1.48 | 51.7 |

[a] in mV vs. Ag/Ag$^+$ for films drop cast onto a platinum button electrode;
[b] in nm for films sprayed to an optical density of ~1.0 a.u.;
[c] in eV for films sprayed to an optical density of ~1.0 a.u.;
[d] Δ % T$_{int}$ where integrated across 380-780 n;
[e] $\lambda_{max}$, peaks are not resolved in this spectrum.

Electrochemical Break-in and Behavior. Prior to characterization, the thin films were subjected to repeated cyclic voltammetry (CV) cycling (25 "aging" cycles) to observe any redox and optical changes between the pristine (as cast) and aged states (post 25 cycles). All polymer films demonstrated reversible aging cycling with electrochemical differences between the first and second scan, stabilizing over subsequent scans. Exploring the oxidation potential onsets via differential pulse voltammetry (DPV) gave an increasing trend of 13 mV to 110 mV to 180 mV for Pro-Pro/EBE to Pro-Ac$_{0.75}$/EBE$_{0.25}$ to Ac-Ac/EBE, respectively, which corthe EBE content is increased from Pro-Ac$_{0.75}$/EBE$_{0.25}$ to Pro-Ac$_{0.70}$/EBE$_{0.30}$ to Pro-Ac$_{0.65}$/EBE$_{0.35}$, the high energy $\pi$-to-$\pi^*$ peak $\lambda_{max}$ exhibits a less extensive blue shift from 505 to 495 to 487 nm, respectively. Concurrently, ratios of the absorbance of the two peaks ($\pi$-to-$\pi^*$/D-A) decrease until absorbance of these peaks becomes nearly equal, reducing from 1.44 for Pro-Ac$_{0.75}$/EBE$_{0.25}$, to 1.18 for Pro-Ac$_{0.70}$/EBE$_{0.30}$, and to 1.04 (for Pro-Ac$_{0.65}$/EBE$_{0.35}$). Pro-Ac$_{0.65}$/EBE$_{0.35}$ exhibits dual-band absorption with a shallow window at 586 nm, making it nearly achromatic.

For all of these polymers, the D-A absorption peak remains relatively fixed at 671-680 nm.

Spectroelectrochemistry of the polymer thin films was performed at 50 mV steps to examine the changes in absorption upon switching, and to detail the electrochromic contrast from the neutral to the most oxidized transmissive states. The extreme states, neutral and fully oxidized, are presented in FIGS. 3 and 4. In general, at the long wavelength peak, the polymers have fully oxidized states with a change in transmittance ($\Delta$ % T)>50% with the exception of Ac-Ac/EBE, likely due to strain from the high AcDOT content preventing extended delocalization in the charged states. However Ac-Ac/EBE exhibits a $\Delta$ % T at the long wavelength peak of 44%, still greater than the $\Delta$ % T observed for the state of the art ECP-Black at 634 nm which is 41%. Ac-Ac/EBE also has a higher transmittance when compared to previously reported green-to-transmissive ECPs, see: Beaujuge et al., *Chemistry of Materials* 2012, 24 (2), 255-68; Zhao et al., *RSC Advances* 2014, 4 (106), 61537-47; and Gunbas et al., *Advanced Materials* 2008, 20 (4), 691-5.

In order to compare effects on contrast, the $\Delta$ % T for these broadly absorbing polymers have been quantified by integrating the neutral and oxidized state spectra across the visible portion of their spectra 380-780 nm. The use of a relaxed donor-acceptor triad within the polymer substantially enhances overall contrast across the visible relative to ECP-Black, as given in Table 1. All polymers, with the exception of Ac-Ac/EBE, have integrated contrast values ($\Delta$ % $T_{int}$) greater than 50%. Ac-Ac/EBE has the lowest integrated contrast, presumably due to a higher degree of strain that prevents enhanced delocalization of charged states. As the EBE content in Pro-$Ac_{0.75}$/$EBE_{0.25}$, Pro-$Ac_{0.70}$/$EBE_{0.30}$, and Pro-$Ac_{0.65}$/$EBE_{0.35}$ is increased, there is little reduction in contrast with growing content of EBE. This means that polymers designed with relaxed donor-acceptor content allow a myriad of carefully tuned colors based on higher EBE content with minimal sacrifice of contrast.

Figure 9:
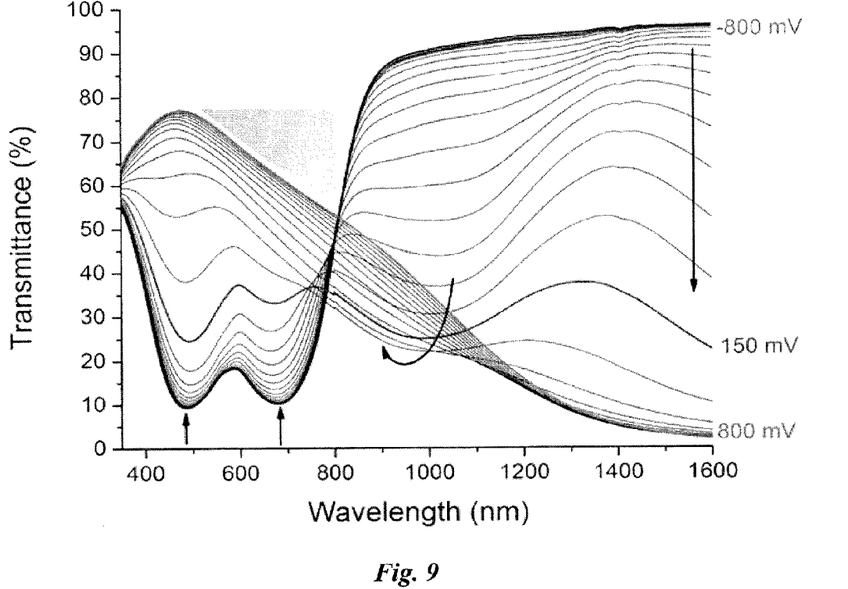
FIG. 9 shows composite spectra for Pro-Ac$_{0.65}$/EBE$_{0.35}$, according to an embodiment of the invention, where neutral, intermediate and fully oxidized states, with increasing oxidation interred by the arrows, and with a shaded triangular region indicating the position of a persistent absorption tail in the oxidized state.

Pro-$Ac_{0.65}$/$EBE_{0.35}$ absorbs very evenly across the visible, appearing black-brown to the eye when neutral. Pro-$Ac_{0.65}$/$EBE_{0.35}$'s fully oxidized state exhibits improved transmission relative to prior art ECP-Black. The full spectroelectrochemical series for Pro-$Ac_{0.65}$/$EBE_{0.35}$ is shown in FIG. 9. The general spectroelectrochemical properties are the same for the relaxed polymers according to embodiments of the invention. As the polymers are progressively oxidized, there is an uneven depletion in the intensity between the two peaks, as demonstrated by the green spectrum corresponding to 150 mV in FIG. 9, where the D-A CT peak appears to oxidize more rapidly than the $\pi$-to-$\pi$* peak. This is likely due to the EDOTs possessing a lower oxidation potential than other DOTs, and indicated in the color values forming a "loop" on colorimetry throughout the oxidation process (vide infra).

The ECPs according to embodiments of the invention exhibit improved contrast relative to ECP-Black. Nevertheless, in the oxidized state a considerable degree of visible light absorption tailing from 600-780 nm remains when compared to spectra of all donor polymers; see Kerszulis et al., *Journal of Materials Chemistry C* 2015, 3 (13), 3211-8. The tailing results in absorption of red light, giving the oxidized states pale blue hues. Although this tailing that is present in nearly all ECPs, is of lesser intensity for the ECPs according to embodiments of the invention.

The chronoabsorptometry showed that, with respect to switching kinetics, all polymers in this family are able to switch with achievement with the maximum contrast at a maximum speed of two seconds. Because of diffusion limiting processes, as switching rate increases, overall loss in contrast is observed, though the contrast is recoverable at two seconds or greater. The contrast has been enhanced by using a relaxed donor-acceptor architecture in random copolymers but, $\Delta$ % T at the D-A peak is less than the higher energy $\pi$-to-$\pi$* peak.

Colorimetry. Color values were determined using the L*a*b* color space, where a* represents the green to redness, and b* the blue to yellowness (negative to positive values respectively). L* depicts the lightness: a value of 0 would be black and 100 would be white. As the magnitude of a*b* increases, color becomes more saturated, and as one traverses between color points or values, the hue changes. The ECPs, according to embodiments of the invention, are broadly absorbing and, as such, they have color values that are low in magnitude or close to the origin (values of zero). These color values are presented in FIG. 8. By controlling neutral state color (a*, b*) through increasing the steric strain of the donors along the main chain the color values transitioned significantly from Pro-Pro/EBE (31, −30), Pro-$Ac_{0.75}$/$EBE_{0.25}$ (23, −4), to Ac-Ac/EBE (−14, 44). Pro-Pro/EBE has a broad but uneven absorption in the visible spectrum allowing unequal amounts of blue and red light to pass, so it appears a deep purple to the eye. Pro-$Ac_{0.75}$/$EBE_{0.25}$ absorbs much of the blue and green light from its short-wavelength $\pi$-to-$\pi$* peak while letting through a portion of red light, appearing as a dark brick-red color. Both of these polymers absorb strongly where the $\bar{y}$ standard observer is most stimulated, giving them low L* values. Due to this uneven absorption, they possess a notable degree of color saturation. Upon switching, a*b* values for the more color-neutral ECPs change minimally while L* values change drastically, indicating an increase in lightness of the most oxidized and transmissive state. Ac-Ac/EBE, with its highly blue shifted $\pi$-to-$\pi$* band, absorbs more blue than red light with a deep window centered at 556 nm, that allows green light to pass. Because it also lets some red light through, this polymer exhibits a lime-green color with a high b* value.

Figure 10A:
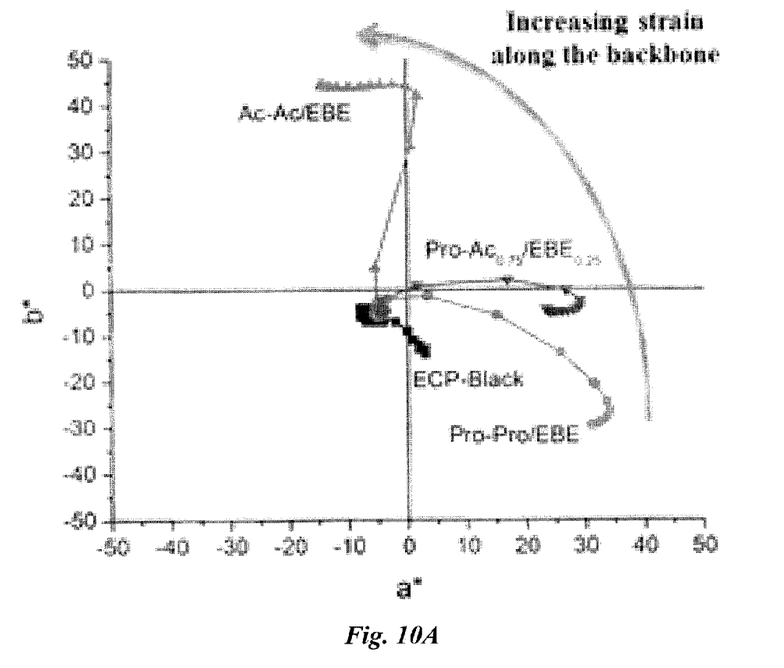
FIG. 10A shows a plot of colorimetry values (a*b*) for ECPs, according to an embodiment of the invention, where the π-to-π* transition was tuned by selecting the identity of a sterically bulky donor for a fixed EBE.
Figure 10B:
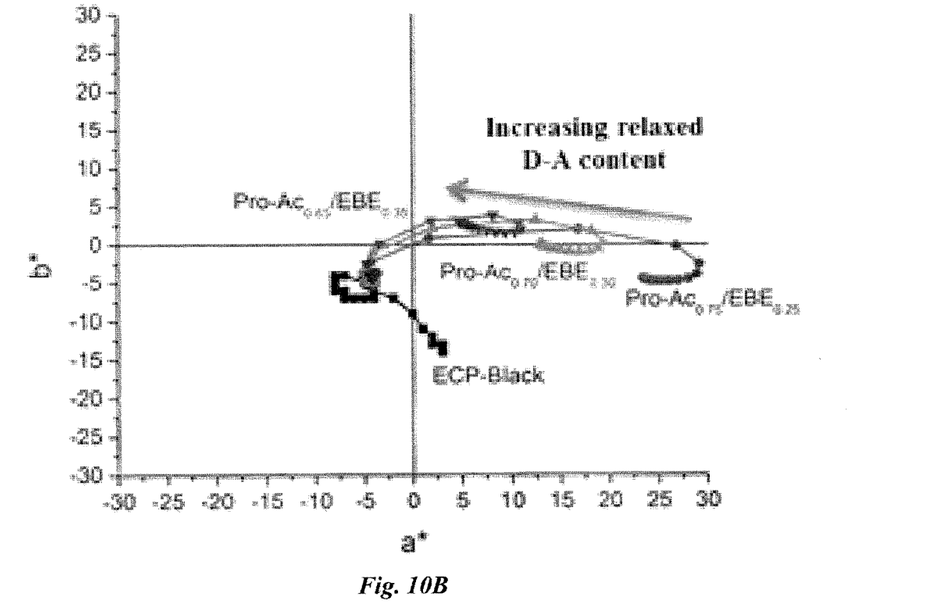
FIG. 10B shows a plot of colorimetry values (a*b*) for ECPs, according to an embodiment of the invention, where the n-to-n* transition was tuned by fixing the identity of a sterically bulky donor and varying the content of EBE.
Figure 10C:
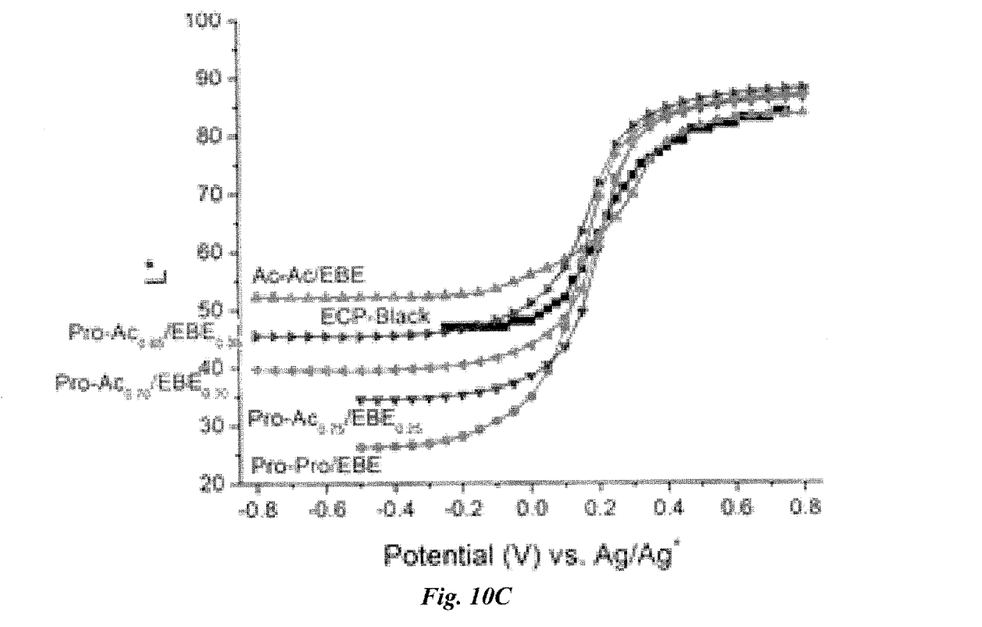
FIG. 10C shows a plot of colorimetry (L*) for ECPs, according to an embodiment of the invention, for various applied potentials.

Because Pro-$Ac_{0.75}$/$EBE_{0.25}$ gave neutral state color values that were closest to the origin with a high contrast across the visible, it was used as a starting point to study the effect of increasing content of the relaxed donor-acceptor EBE on color and contrast. The longer wavelength peak would increase in absorbance until it matched the absorbance of the shorter, thereby making the subsequent materials progressively more achromatic or color neutral. This is the second route to control color. Looking at FIG. 10B, as the content of EBE is raised from Pro-$Ac_{0.75}$/$EBE_{0.25}$ (23, −4), to Pro-$Ac_{0.70}$/$EBE_{0.30}$ (13, 0), to Pro-$Ac_{0.65}$/$EBE_{0.35}$ (5, 3), the saturation is progressively sapped and the colors become more muted. Due to the more even absorption (and shallow window that is present in these systems) more light is able to overlap with the $\bar{y}$ standard observer, raising the lightness. Pro-$Ac_{0.70}$/$EBE_{0.30}$ absorbs more red light than Pro-$Ac_{0.75}$/$EBE_{0.25}$ and its a*b* color values decrease overall, putting it within the lower b* region of what Munsell defines as brown. Following Pro-$Ac_{0.70}$/$EBE_{0.30}$, Pro-$Ac_{0.65}$/$EBE_{0.35}$ absorbs even more red light, reducing the saturation further to appear black-brown. Though it has low a*b* values, the positive magnitude is a result of residual red and orange light transmitting due to the window at 586 nm. A "loop" (vide supra) can be seen in a*b* color plots of FIG. 10A and FIG. 10B and is a result of the longer wavelength D-A band bleaching faster upon oxidation than the $\pi$-to-$\pi$* band. This allows more red light to reach the eye with increasing voltage, so as a* becomes more positive and the polymers go through reddened intermediate states. Ac-Ac/EBE, on the other hand, passes through yellow-hued intermediate states because more red light with green light is stimulating both the M and L cones, respectively, which the brain then interprets as yellow.

Figure 11:
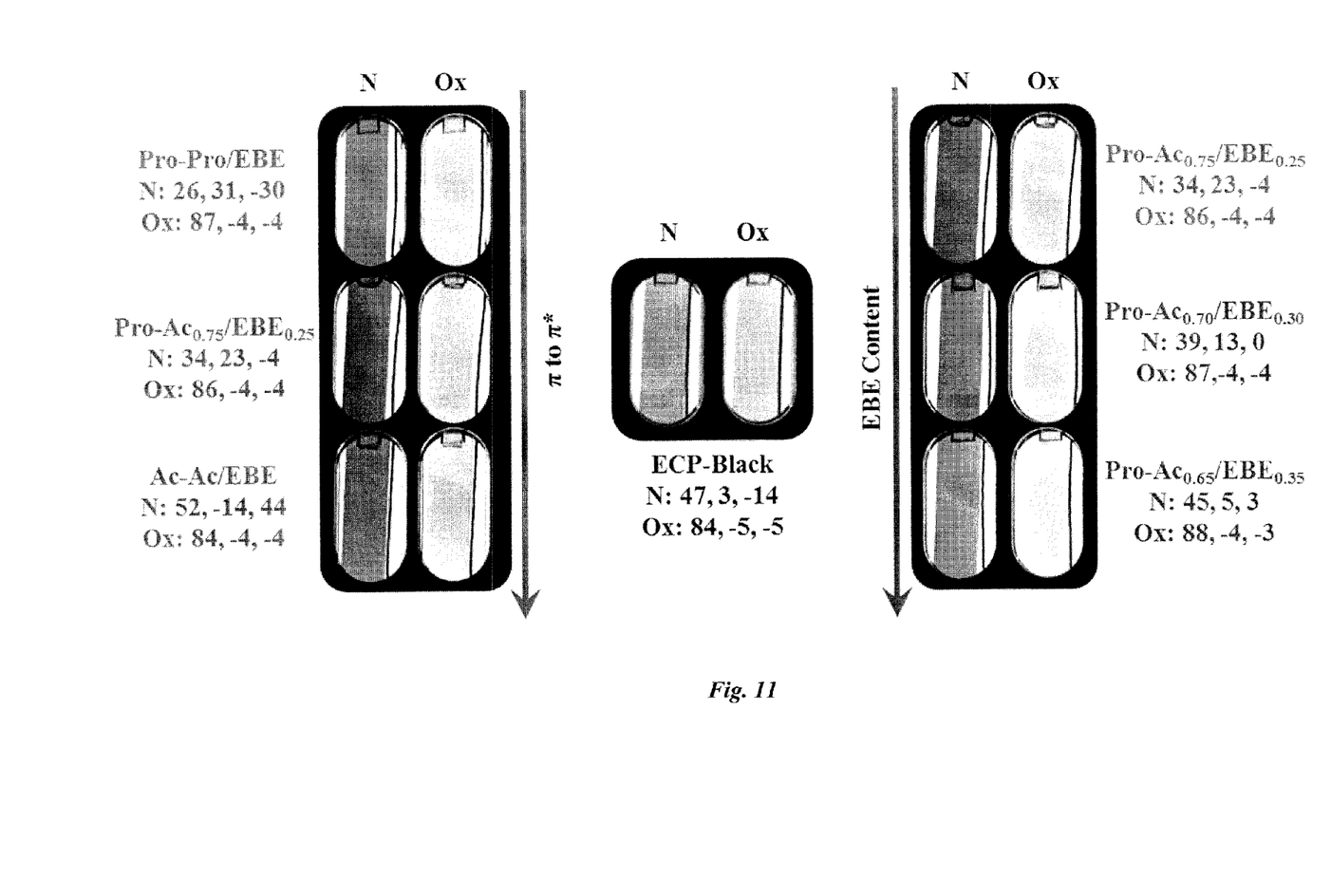
FIG. 11 shows photographs of ECPs, according to an embodiment of the invention, in their neutral (N) and fully oxidized (Ox) forms and the ECPs L*,a*,b* color values and for ECP-Black for comparison with films formed by spraying to ~1.0 a.u.

A comparison of the neutral and oxidized state color values and extreme state photographs are presented in FIG. 11. A variety of neutral color states can be tuned by manipulating steric interactions, primarily steric donor identity, and, to reduce saturation, the proportion of EBE triad is increased. As the proportion of EBE is increased, there is minimal reduction in contrast. The difference in color values of the fully oxidized transmissive states can be determined by taking a geometric distance of color points using the following equation:

$$\Delta E^*_{ab} = \sqrt{(\Delta L^*)^2 + (\Delta a^*)^2 + (\Delta b^*)^2}$$

where $\Delta E^*_{ab}$ represents the difference between colors points, with values below 2.3 (or what the CIE determines as a just noticeable difference (JND)) indicating differences not noticeable to the eye. Comparing the fully oxidized color states between ECP-Black and Pro-Ac$_{0.65}$/EBE$_{0.35}$, a $\Delta E^*_{ab}$ of 4.8 is calculated, confirming a noticeable difference, with Pro-Ac$_{0.65}$/EBE$_{0.35}$, having the least color once fully oxidized. This allows one to quantify the difference in color between different ECPs or color properties between certain voltage steps, and determine if the eye is able to notice the difference between color points.

The Pro-Ac/EBE series of materials exhibit reddish hues, which reach a minimum with the Pro-Ac$_{0.65}$/EBE$_{0.35}$ composition. A slight reddish coloration is retained in Pro-Ac$_{0.65}$/EBE$_{0.35}$ as a result of the small disparity in absorption between the two major absorption peaks observed, in combination with an absorption trough centered at 586 nm. Solution co-processing of an additional high-contrast ECP into thin films with Pro-Ac$_{0.65}$/EBE$_{0.35}$ can produce more aesthetically appealing films by "smoothing out" the spectral profile of cast films, while improving the contrast observed upon switching.

Figure 12A:
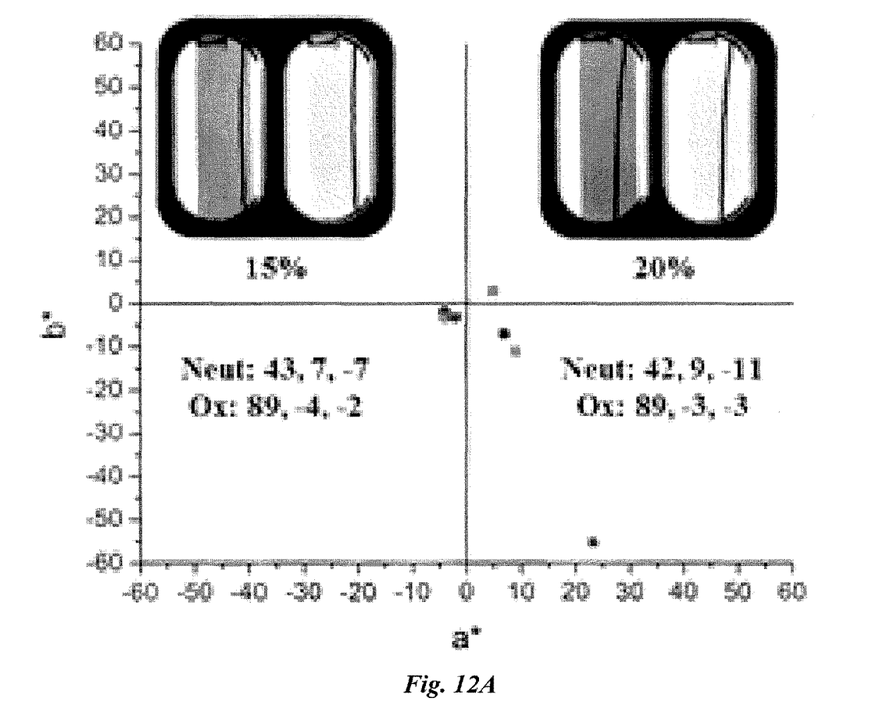
FIG. 12A shows photographs of 85:15 and 80:20 blended ECPs, according to an embodiment of the invention, in their neutral (left) and fully oxidized (right) forms imposed on a plot of colorimetry values (a*b*) for the two blends and the Pro-Ac$_{0.65}$/EBE$_{0.35}$ and the all donor ProDOT$_2$-EDOT blended, where the cluster of circles represents oxidized state films and squares represent neutral states with thee squares of descending b* values are for the Pro-Ac$_{0.65}$/EBE$_{0.35}$, 15% mixture, 20% mixture, and ProDOT$_2$-EDOT, respectively.
Figure 12B:
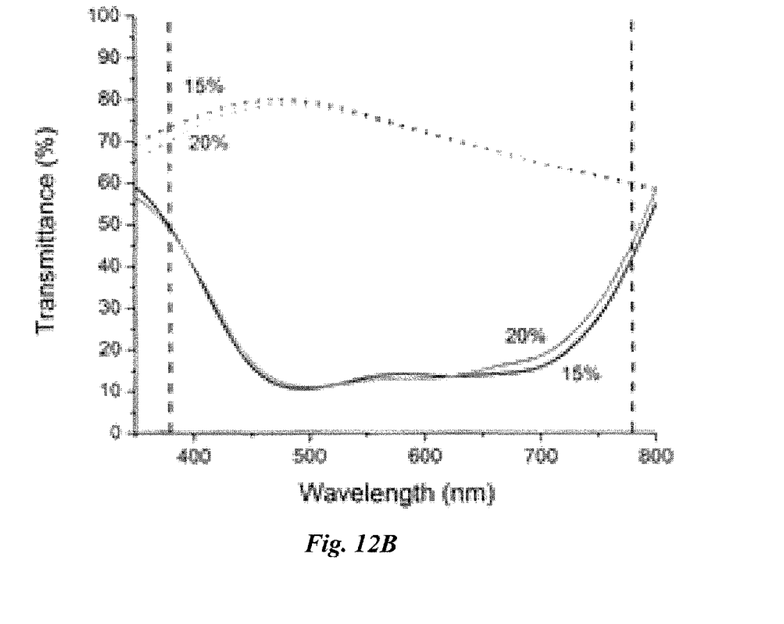
FIG. 12B shows composite transmission spectra for the neutral (solid lines) and fully oxidized (dotted lines) for the 15 and 20% blended ECPs, according to an embodiment of the invention, of FIG. 12A for various EBE content.

Co-processing an 85:15 w/w mixture of Pro-Ac$_{0.65}$/EBE$_{0.35}$:ProDOT$_2$-EDOT, an all donor polymer, produces such a mixture, with a particularly flat spectral profile throughout the range of roughly 450-700 nm, as shown in FIG. 12B. While an overall increase in chromaticity is observed for this mixture, the most notable change is the production of an aesthetically pleasing indigo-black hue, seen in the lowering of the b* coordinate from 3 to –7, as shown in FIG. 12A. Additionally, an improvement to the integrated contrast is made with this mixture, from 51.7% in the neat polymer to 53.0% in the mixture. It should be noted that a mild asymmetry is still present in the spectral profile of the 15% ProDOT$_2$-EDOT mixture. Further incorporation of ProDOT$_2$-EDOT, by increasing the content to 20% by weight, does not address the asymmetry. Rather it produced a mixture with higher chromaticity, and an observed contrast lower than that of the neat polymer (51.3%).

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:
1. An improved contrast electrochromic polymer (ECP), comprising: at least one copolymer block having a multiplicity of repeating units, wherein the copolymer comprises a plurality of donor (D) unit sequences that is a normal distribution of at least one solubilizing donor (D) repeating unit chosen from substituted propylenedioxythiophene units (ProDOT) and/or substituted acyclic dioxythiophene units (AcDOT) and a plurality of monodispersed trimer sequences selected from the group consisting of: an acceptor (A) unit bonded between two ethylenedioxythiophene units (EDOT), an acceptor (A) unit bonded between two methylenedioxythiophene units (MDOT); and a fused DAD trimer of the structure:

where X is S, O, NR', R is H or alkoxy, and R' is H or alkyl;
   wherein one of the monodispersed trimer sequences separates two of the donor sequences, and
   whereby the electrochromic polymer (ECP) is soluble in a solvent.

2. The improved contrast electrochromic polymer (ECP) according to claim 1, wherein the acceptor unit comprises a residue of 2,1,3-benzothiadiazole (BTD).

3. The improved contrast electrochromic polymer (ECP) according to claim 1, wherein the monodispersed trimer sequence is EDOT-BTD-EDOT (EBE).

4. The improved contrast electrochromic polymer (ECP) according to claim 1, wherein the substituents on the ProDOT and/or the AcDOT are straight or branched alkyl chains of 1-24 carbon atoms, optionally interrupted, one or more times, by one or more oxygen atoms, sulfur atoms, —SO—, —SO$_2$—, carbonyl, —COO—, —CONH—, —NH—, —CON(C$_{1-8}$ alkyl)- or —N(C$_{1-8}$ alkyl)-, wherein the uninterrupted or interrupted alkyl is optionally substituted, one or more times, by one or more C$_{3-6}$ cycloalkyl groups, halogen, —OR, —COOR, —COOM, —SO$_3$M, —SO$_3$H, phosphonic acid, halogen, —CONR'R, —NR'R, phosphonate salt, or ammonium salt, wherein M is a nitrogen comprising an ammonium cation or a metal cation, and wherein R and R' are, independently, hydrogen, C$_{1-24}$ alkyl, C$_{3-24}$ alkenyl, C$_{3-6}$ cycloalkyl or C$_{1-24}$alkylcarbonyl, or where R and R', together form a 5-, 6- or 7-membered ring that is uninterrupted or interrupted by —O—, —NH— or —N(C$_{1-12}$ alkyl)-.

5. The improved contrast electrochromic polymer (ECP) according to claim 1, wherein the donor sequences have ProDOT units bound to the monodispersed trimer sequence.

6. The improved contrast electrochromic polymer (ECP) according to claim 1, wherein the donor sequences have sequences of ProDOT units alternating with AcDOT units.

7. The improved contrast electrochromic polymer (ECP) according to claim 1, wherein the ECP has the structure: Pro-Pro/EBE; Ac-Ac/EBE; or Pro-Ac$_x$/EBE$_{1-x}$ where x is a fraction between 0.5 and 0.9.

8. The improved contrast electrochromic polymer (ECP) according to claim 1, wherein the ECP has the structure: Pro-Ac$_{0.75}$/EBE$_{0.25}$, Pro-Ac$_{0.70}$/EBE$_{0.30}$, or Pro-Ac$_{0.65}$/EBE$_{0.35}$.

9. An electrochromic device, comprising at least one film or solution of at least one improved contrast electrochromic polymer (ECP) according to claim 1.

10. The electrochromic device according to claim 9, wherein at least one of the at least one film or solution further comprises at least one acceptor free electrochromic polymer, and wherein the at least one acceptor free electrochromic polymer can be included in one to 50% with the at least one improved contrast electrochromic polymer (ECP) according to claim 1.

11. The electrochromic device according to claim 10, wherein the acceptor free electrochromic polymer comprises $ProDOT_2$-EDOT and the improved contrast electrochromic polymer (ECP) according to claim 1 comprises Pro-$Ac_{0.65}$/$EBE_{0.35}$.

12. A method of preparing an improved contrast electrochromic polymer (ECP) according to claim 1 comprising:
  providing a plurality of DAD trimers having hydrogens as terminal reactive groups;
  providing a plurality of a first solubilizing donor repeating units having hydrogen reactive groups;
  providing a plurality of a second solubilizing donor repeating units having bromine reactive groups;
  combining the plurality of DAD trimers, plurality of first solubilizing donor repeating units and plurality of second solubilizing donor repeating units;
  promoting condensation between the hydrogen and the bromine reactive groups; and
  isolating the electrochromic polymer (ECP) according to claim 1.

* * * * *

UNITED STATES PATENT AND TRADEMARK OFFICE
CERTIFICATE OF CORRECTION

PATENT NO. : 9,902,804 B2
APPLICATION NO. : 15/049687
DATED : February 27, 2018
INVENTOR(S) : John R. Reynolds and Justin Adam Kerszulis It is certified that error appears in the above-identified patent and that said Letters Patent is hereby corrected as shown below:

In the Specification

Column 1,
Line 48, "a-conjugated" should read --π-conjugated--.

Column 4,
Line 25, "herein arc" should read --herein are--.

Column 5,
Line 7, "don.or units" should read --donor units--.
Line 14, "thereof Preparation" should read --thereof. Preparation--.
Line 23, "n-oetyl" should read --n-octyl--.

Column 6,
Line 41, "lengths In and" should read --lengths m and--.
Line 43, "oxidized.state" should read --oxidized state--.
Line 52, "EBE truer" should read --EBE trimer--.
Line 65, "π-to-π*" should read --π to π*--.

Column 7,
Line 10, "two :factors" should read --two factors--.

Column 8,
Line 9, "are 0.10 eV" should read --are ~0.10 eV--.

Signed and Sealed this
Twenty-sixth Day of June, 2018

Andrei Iancu
*Director of the United States Patent and Trademark Office*